(12) United States Patent
Lee et al.

(10) Patent No.: US 10,446,324 B2
(45) Date of Patent: Oct. 15, 2019

(54) THIN FILM CAPACITOR

(71) Applicant: SAMSUNG ELECTRO-MECHANICS CO., LTD., Suwon-si, Gyeonggi-do (KR)

(72) Inventors: Kyo Yeol Lee, Suwon-si (KR); Hai Joon Lee, Suwon-si (KR); Seung Mo Lim, Suwon-si (KR); Ho Phil Jung, Suwon-si (KR); In Young Kang, Suwon-si (KR); Yun Hee Kim, Suwon-si (KR); Yun Sung Kang, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 15/651,617

(22) Filed: Jul. 17, 2017

(65) Prior Publication Data

US 2018/0144873 A1 May 24, 2018

(30) Foreign Application Priority Data

Nov. 18, 2016 (KR) .................. 10-2016-0153720

(51) Int. Cl.
*H01G 4/33* (2006.01)
*H01G 4/008* (2006.01)
*H01G 4/12* (2006.01)
*H01G 4/30* (2006.01)

(52) U.S. Cl.
CPC .............. *H01G 4/33* (2013.01); *H01G 4/008* (2013.01); *H01G 4/1245* (2013.01); *H01G 4/30* (2013.01)

(58) Field of Classification Search
CPC ........ H01G 4/33; H01G 4/008; H01G 4/1245; H01G 4/30
See application file for complete search history.

(56) References Cited

U.S. PATENT DOCUMENTS

| | | | | |
|---|---|---|---|---|
| 6,297,527 | B1 * | 10/2001 | Agarwal | H01G 4/008 257/296 |
| 2008/0225569 | A1 * | 9/2008 | Nawano | H01G 4/085 365/145 |
| 2008/0258191 | A1 | 10/2008 | Baniecki et al. | |
| 2009/0186150 | A1 * | 7/2009 | Kurokawa | C01G 33/006 427/125 |
| 2009/0297696 | A1 * | 12/2009 | Pore | C23C 16/405 427/79 |
| 2015/0103465 | A1 * | 4/2015 | Kang | H01G 4/1227 361/301.4 |

(Continued)

FOREIGN PATENT DOCUMENTS

| | | |
|---|---|---|
| JP | 4382103 B2 | 12/2009 |
| KR | 10-0296128 B1 | 8/2001 |
| KR | 10-2002-0002083 A | 1/2002 |

*Primary Examiner* — Dion Ferguson
(74) *Attorney, Agent, or Firm* — Morgan, Lewis & Bockius LLP

(57) ABSTRACT

A thin film capacitor includes a body including alternately stacked first and second electrode layers and dielectric layers on a substrate, the second electrode layer including a second lower electrode layer and a second upper electrode layer formed on the second lower electrode layer, the second lower electrode layer including a material having a higher band gap energy than the first electrode layer and the second upper electrode layer.

15 Claims, 6 Drawing Sheets

(56) References Cited

U.S. PATENT DOCUMENTS

| | | | |
|---|---|---|---|
| 2016/0016813 A1* | 1/2016 | Shimoda | H01G 4/33 |
| | | | 252/518.1 |
| 2016/0268048 A1* | 9/2016 | Zelner | H01G 4/012 |
| 2017/0057230 A1* | 3/2017 | Asaoka | B41J 2/14201 |
| 2018/0040422 A1* | 2/2018 | Shin | H01G 4/008 |
| 2018/0061581 A1* | 3/2018 | Lee | H01G 4/33 |
| 2018/0174750 A1* | 6/2018 | Yoon | H01G 4/06 |

* cited by examiner

THIN FILM CAPACITOR

CROSS-REFERENCE TO RELATED APPLICATION(S)

This application claims the benefit of priority to Korean Patent Application No. 10-2016-0153720, filed on Nov. 18, 2016 with the Korean Intellectual Property Office, the disclosure of which is incorporated herein by reference in its entirety.

TECHNICAL FIELD

The present disclosure relates to a thin film capacitor.

BACKGROUND

In accordance with recent trends for thinness in an application processor (AP) for a smartphone, the necessity of a thinner thin film capacitor than a multilayer ceramic capacitor (MLCC) has increased.

The thin film capacitor has an advantage in that a thin capacitor may be developed using thin film technology. However, since the number of dielectric layers to be stacked is significantly restricted, as compared to an MLCC, it may be difficult to implement high capacitance.

The thin film capacitor may be manufactured by a sol-gel method, a sputtering method, a chemical vapor deposition (CVD) method, a pulsed laser deposition (PLD) method, or the like, the thin film technology, and a dielectric layer containing a material with high permittivity and having a wide area, a thin thickness, and a multilayer structure has been required for high capacitance.

More specifically, in a case of implementing high capacitance through a multilayer dielectric structure using the thin film technology, leakage current characteristics may not be secured.

Generally, in order to increase capacitance of a capacitor, a plurality of first and second electrode layers and dielectric layers are manufactured, and the dielectric layers are connected to each other in parallel. Since in a thin film capacitor having a multilayer structure in which dielectric layers are connected to each other in parallel, electrical fields applied to each of the dielectric layers are formed to have opposing polarities as each other, per the dielectric layer, leakage current characteristics may be deteriorated.

More specifically, in the dielectric layer formed on the electrode layer, a pyrochlore phase, a defect occurring due to a thin film process, is present in a region adjacent to the electrode layer, and a defect of a negative (−) charge (negative (−) charge defect) is formed below the dielectric layer, thereby causing a bias polarity phenomenon depending on a direction of an electrode applied with a voltage. That is, leakage current characteristics may be changed depending on a direction in which the voltage is applied, and in the case of the thin film capacitor having a multilayer structure in which the dielectric layers are connected to each other in parallel, the leakage current characteristics may be deteriorated.

Therefore, a method capable of securing the leakage current characteristics of the dielectric layer is been required.

SUMMARY

An aspect of the present disclosure may provide a thin film capacitor securing capacitance in the capacitor while improving leakage current characteristics of dielectric layers.

According to an aspect of the present disclosure, a thin film capacitor may include: a body formed by alternately stacking first and second electrode layers and dielectric layers on a substrate, wherein the second electrode layer is composed of a second lower electrode layer and a second upper electrode layer, the second lower electrode layer being formed of a material having higher band gap energy than that of the first electrode layer and the second upper electrode layer.

BRIEF DESCRIPTION OF THE DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will be described in detail with reference to the accompanying drawings.

Hereinafter, a thin film capacitor according to the present disclosure will be described.

Figure 1:
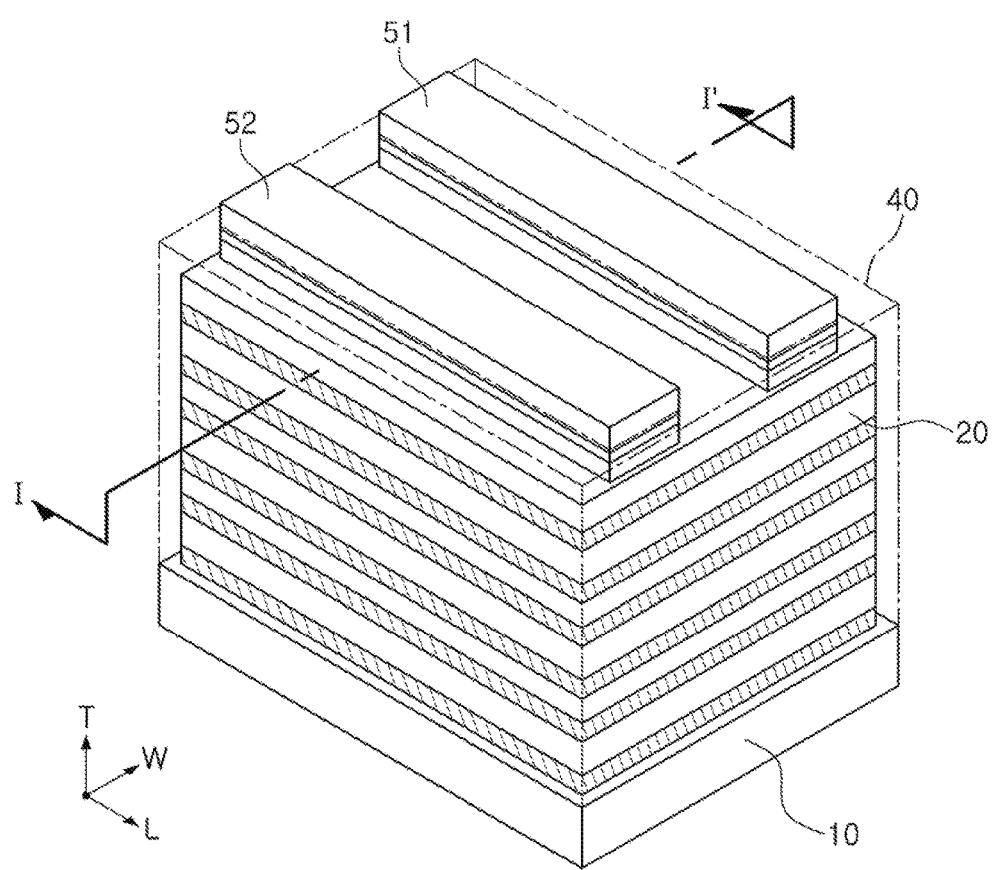
FIG. 1 is a perspective view illustrating a thin film capacitor according to exemplary embodiments of the present disclosure.
Figure 2:
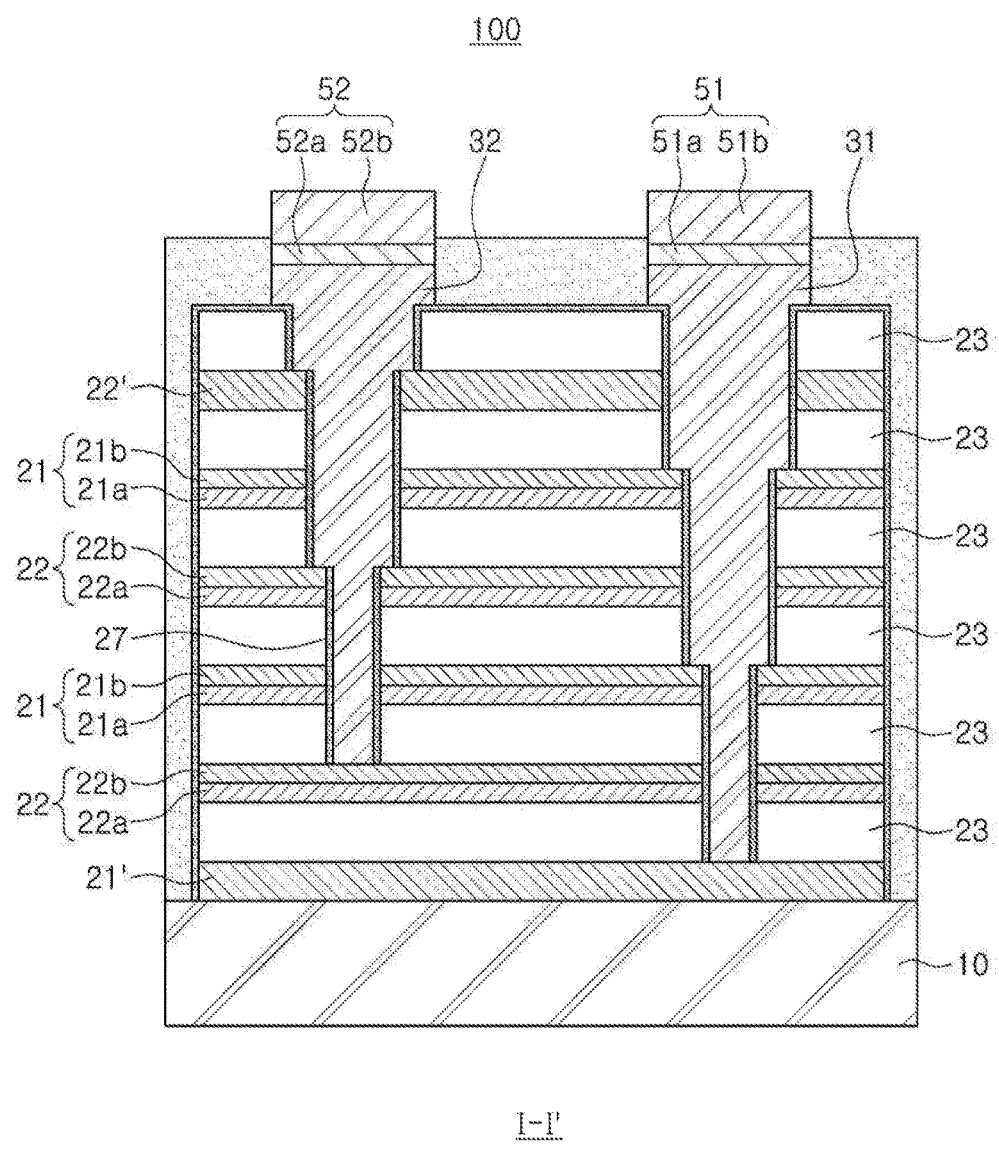
FIG. 2 is a cross-sectional view illustrating the thin film capacitor taken along line I-I' of FIG. 1.

FIG. 1 is a perspective view illustrating a thin film capacitor according to exemplary embodiments of the present disclosure, and FIG. 2 is a cross-sectional view illustrating the thin film capacitor taken along line I-I' of FIG. 1.

Referring to FIGS. 1 and 2, a thin film capacitor 100 according to exemplary embodiments of the present disclosure may include a body 20 formed by alternately stacking first and second electrode layers 21 and 22 and dielectric layers 23 on a substrate 10, wherein the second electrode layer is composed of a second lower electrode layer and a second upper electrode layer formed on the second lower electrode layer, the second lower electrode layer being formed of a material having higher band gap energy than that of the first electrode layer and the second upper electrode layer.

The substrate 10 may be a layer (substrate) contacting a lowermost first electrode layer 21' among the first electrode layers, and be formed of a material having insulation properties. The material may be one selected from $Al_2O_3$, $SiO_2$/Si, MgO, $LaAlO_3$ and $SrTiO_3$, but is not limited thereto. The substrate 10 may have sufficient flatness and surface roughness.

In the body 20 having a stacking structure in which the lowermost first electrode layer 21' is formed on the substrate 10, the dielectric layer 23 is formed on the lowermost first electrode layer 21', the second electrode layer 22 is formed on the dielectric layer 23, the plurality of first and second electrode layers 21 and 22 may be alternately stacked with each of the dielectric layers 23 interposed therebetween. Here, the numbers of stacked dielectric layers and first and second electrode layers are not limited to those in the accompanying drawing.

As the numbers of stacked first and second electrode layers 21 and 22 and dielectric layers 23 are increased, equivalent series resistance (ESR) of the capacitor may be decreased.

Each of the first and second electrode layers 21 and 22 may be formed as a single layer without a predetermined pattern.

The first and second electrode layers 21 and 22 may be formed of a conductive material.

The first and second electrode layers 21 and 22 may be formed using a vapor phase synthesis method such as a sputtering method, a vapor deposition method, or the like, and be processed by a photolithography method and a dry etching method.

The dielectric layer 23 may contain a perovskite material as a material having high permittivity.

The perovskite material may be a dielectric material of which permittivity may be significantly changed, for example, a barium titanate ($BaTiO_3$)-based material, a strontium titanate ($SrTiO_3$)-based material, a $BaSrTiO_3$ (BST)-based material, a lead $PbZrTiO_3$ (PZT)-based material or the like, but is not limited thereto.

The dielectric layer may be formed by a sol-gel method, sputtering deposition method, a metal organic chemical vapor deposition (MOCVD) method, a plasma enhanced chemical vapor deposition (PECVD) method, a laser ablation method or the like.

The first and second electrode layers 21 and 22 or the dielectric layer 23 may be subjected to surface treatment.

A surface treatment method, which is a method of planarizing a surface, may be performed by etching and/or polishing. For example, the surface treatment method may be performed by a dry etching method such as an ion beam etching method or a chemical mechanical polishing (CMP) method, but is not limited thereto.

In a case of a dielectric layer formed of the $PbZrTiO_3$ (PZT)-based material, due to volatility of a PbO ingredient, even in the case that PbO is added excessively, an oxygen vacancy defect may exist in the dielectric layer due to volatilization of Pb. In order to compensate for the oxygen vacancy defect as describe above, an additive serving as a donor such as La, Mn Nb, and the like, may be used, such that a defect in the dielectric layer may be decreased by allowing an additive to be substituted in a Zr or Ti site, and allowing extra oxygen to be positioned in oxygen vacancy sites.

Therefore, the dielectric layer may be formed of a $PbZrTiO_3$ (PZT)-based material doped with at least one of La, Mn, and Nb in order to form a crystalline phase having a high-content perovskite structure.

Generally, in a case of forming a dielectric layer formed of the $PbZrTiO_3$ (PZT)-based material in a thin film capacitor, when the dielectric layer is formed on an electrode layer formed of Pt, a large amount of a pyrochlore phase may exist in a region adjacent to the electrode layer, such that a negative (−) charge defect may occur below the dielectric layer, thereby causing a bias polarity phenomenon depending on a direction of an electrode applied with a voltage.

In a case in which a dielectric layer is formed on an electrode layer formed of Ir or Ru, a crystalline phase having a high-content perovskite structure may be formed, but there is a problem in that leakage current characteristics of the thin film capacitor may be deteriorated.

Figure 3:
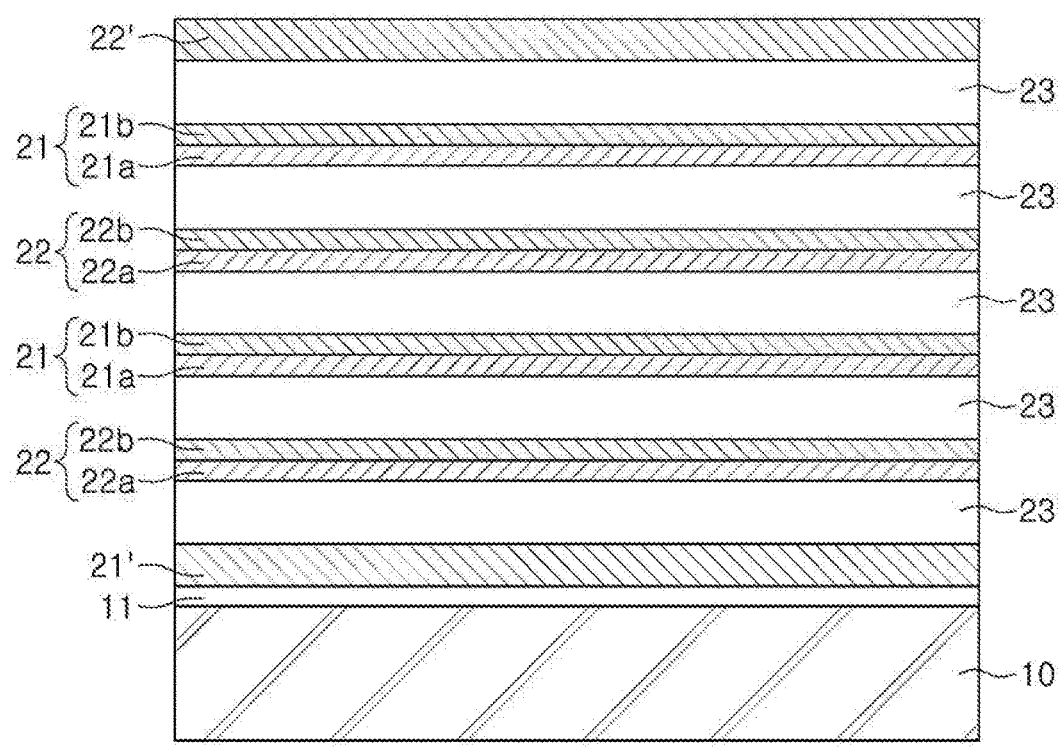
FIG. 3 is a front view illustrating a body of the thin film capacitor of FIG. 2.

FIG. 3 is a front view illustrating a body of the thin film capacitor of FIG. 2.

Referring to FIGS. 2 and 3, in the thin film capacitor according to the exemplary embodiment of the present disclosure, the second electrode layer 22 may be composed of the second lower electrode layer 22a and the second upper electrode layer 22b formed on the second lower electrode layer 22a, the second lower electrode layer 22a may be formed of the material having higher band gap energy than that of the first electrode layer 21 and the second upper electrode layer 22b, such that leakage current characteristics of the thin film capacitor may be improved by applying electric field-current density characteristics depending on the material of the second electrode layer.

In a case of manufacturing a thin film capacitor having a single layer structure, as a material of a second electrode layer, a Pt material having a high work function may be used alone, but since there is a need to consider crystal growth in at least two dielectric layers in order to manufacture a thin film capacitor having a multilayer structure, it is important to determine a material of the electrode layer suitable for the crystal growth.

The second electrode layer 22 formed on the dielectric layer may have a double layer electrode structure composed of the second lower electrode layer 22a and the second upper electrode layer 22b.

The second lower electrode layer 22a may be formed of Pt, and the second upper electrode layer 22b may be formed of at least one of Ir and Ru.

In the second electrode layer, the second lower electrode layer 22a may have a thickness of 50 to 100 nm, and the second upper electrode layer 22b may have a thickness of 50 to 200 nm, but are not limited thereto.

In the second electrode layer, the second lower electrode layer 22a contacting the dielectric layer disposed below may be formed of the material having a large band gap energy as compared to the second upper electrode layer 22b formed on the second lower electrode layer, and be formed of Pt having a band gap energy ($E_{BG}$) of 1.8 eV. When the second upper electrode layer contacting an upper portion of the dielectric layer is formed of Pt, leakage current characteristics may be excellent.

The dielectric layer 23 may include a perovskite phase, and in the dielectric layer formed on the first electrode layer and the dielectric layer formed on the second electrode layer, regions adjacent to interfaces of the dielectric layer contacting the first and second electrode layers may include the pyrochlore phase.

The perovskite phase may allow the dielectric layer to secure dielectric characteristics, and the pyrochlore phase may serve as defects to deteriorate the dielectric characteristics. Therefore, the higher the ratio of the perovskite phase in the dielectric layer, the better the dielectric characteristics.

The second upper electrode layer 22b may be formed of at least one of Ir and Ru having a band gap energy ($E_{BG}$) of 1.0 eV or less, in order to secure a crystalline phase having a high-content perovskite structure of the dielectric layer.

When the second upper electrode layer 22b is formed of at least one of Ir and Ru, since crystallinity of the perovskite phase of the dielectric layer formed on the second upper electrode layer is improved, the dielectric characteristics and leakage current characteristics may be improved.

According to the present disclosure, the second electrode layer may have a structure composed of the second lower electrode layer and the second upper electrode layer formed of Ir on the second lower electrode layer, that is, an Ir/Pt electrode structure, such that crystallinity of the dielectric layer may be secured, and at the same time, excellent leakage current characteristics may be secured. Further, due to improvement of the leakage current characteristics, a capacitor capable of enduring in a high voltage region may be implemented.

The first electrode layer 21 may be a single layer formed of at least one of Ir and Ru.

In this case, a direction in which a voltage is applied to the capacitor may be constantly determined, and the first electrode layer is applied with a positive (+) voltage.

In a thin film capacitor according to another exemplary embodiment of the present disclosure, a first electrode layer 21 may have the same double electrode layer structure as the second electrode layer.

Figure 4:
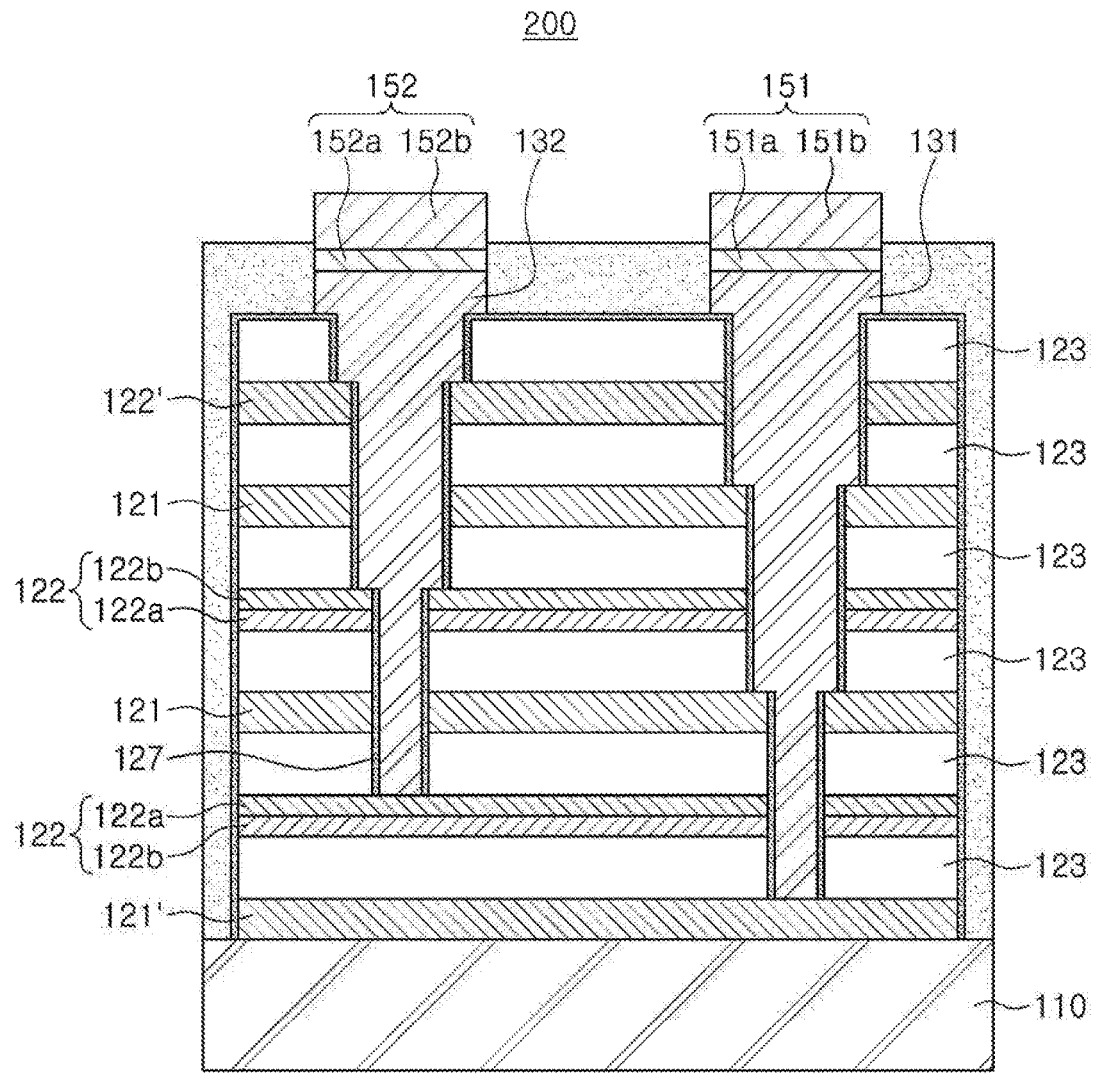
FIG. 4 is a cross-sectional view illustrating a thin film capacitor according to an exemplary embodiment of the present disclosure, different from that shown in FIG. 2, taken along line I-I' of FIG. 1.
Figure 5:
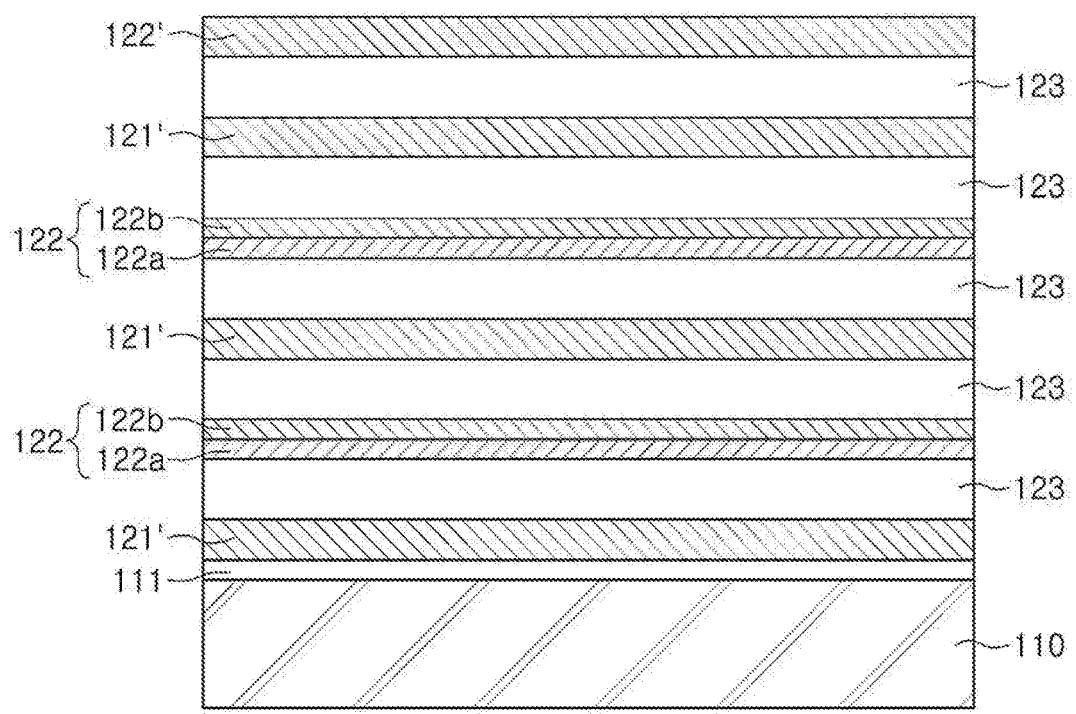
FIG. 5 is a front view illustrating a body of the thin film capacitor of FIG. 4.

FIG. 4 is a cross-sectional view illustrating a thin film capacitor according to another exemplary embodiment in the present disclosure, taken along line I-I' of FIG. 1, and FIG. 5 is a front view illustrating a body of the thin film capacitor of FIG. 4.

Referring to FIGS. 4 and 5, a second electrode layer 122 may be composed of a second lower electrode layer 122a and a second upper electrode layer 122b formed on the second lower electrode layer.

The second lower electrode layer 122a may be formed of Pt, and the second upper electrode layer 122b may be formed of at least one of Ir and Ru.

In this case, there is no limitation in a direction in which a voltage is applied to the thin film capacitor.

Among the first electrode layers, a lowermost first electrode layer 121' may be formed of at least one of Ir and Ru in order to secure a perovskite phase of a dielectric layer formed on the first electrode layer.

Among the second electrode layers, an uppermost second electrode layer 122' may be formed of Pt in order to improve leakage current characteristics.

The following Table 1 illustrates capacitance and breakdown voltage (BDV) depending on structures of first and second electrode layers. Each of the samples was manufactured at the same size using the same material in dielectric layers, but materials and structures of first and second electrode layers were different from each other.

On the contrary, it may be appreciated that in a case in which the first and second electrode layers were formed of Ir (sample 2), leakage current characteristics were not secured.

In the present disclosure, the term "first and second" means different polarities.

Referring to FIGS. 2 and 4, the first vias 31 and 131 may be electrically connected to the first electrode layers 21 and 121, respectively, and penetrate from one surface of the body to lowermost first electrode layers adjacent to the substrate, respectively, and the second vias 32 and 132 may be electrically connected to the second electrode layers 22 and 122 and penetrate from one surface of the body to lowermost second electrode layers adjacent to the substrate, respectively. The first vias 31 and 132 may be electrically insulated from the second vias 32 and 132, respectively.

The first and second vias 31, 32, 131 and 132 may be alternately disposed in one direction, and be alternately disposed in a zigzag shape on the same line or in one direction.

When the first and second vias are close to each other, a current is generated in a direction in which magnetic induction is offset by each other, such that magnetic induction may be suppressed, and as a current path is decreased, which is effective in decreasing ESR due to a decrease in resistance.

The first and second vias 31, 32, 131, and 132 may be formed by alternately forming a plurality of first and second via holes in the body in the stacking direction of the body and filling a conductive material in the first and second via holes.

The conductive material may be filled in the first and second via holes and the filling may be performed by a plating method. The first and second via holes may be formed by a laser drilling method or mechanical drilling method, but the disclosure is not limited thereto.

The conductive material may be copper (Cu), aluminum (Al), gold (Au), silver (Ag), platinum (Pt) or the like, but is not limited thereto.

When the first and second vias are formed in plural, contact surfaces of the first and second vias contacting the

TABLE 1

| Sample | Structure of First Electrode Layer | Structure of Second Electrode Layer | Capacitance [nF] | BDV (+) [V] | BDV (−) [V] |
|---|---|---|---|---|---|
| 1* | Pt Single Layer | Pt Single Layer | 23 | 2 | 4 |
| 2* | Ir Single Layer | Ir Single Layer | 76 | 11 | 13 |
| 3 | Ir Single Layer | Ir/Pt Double Layer | 78 | 18 | >40 |
| 4 | Ir/Pt Double Layer | Ir/Pt Double Layer | 77 | 18 | >40 |

*Comparative Example

Figure 6:
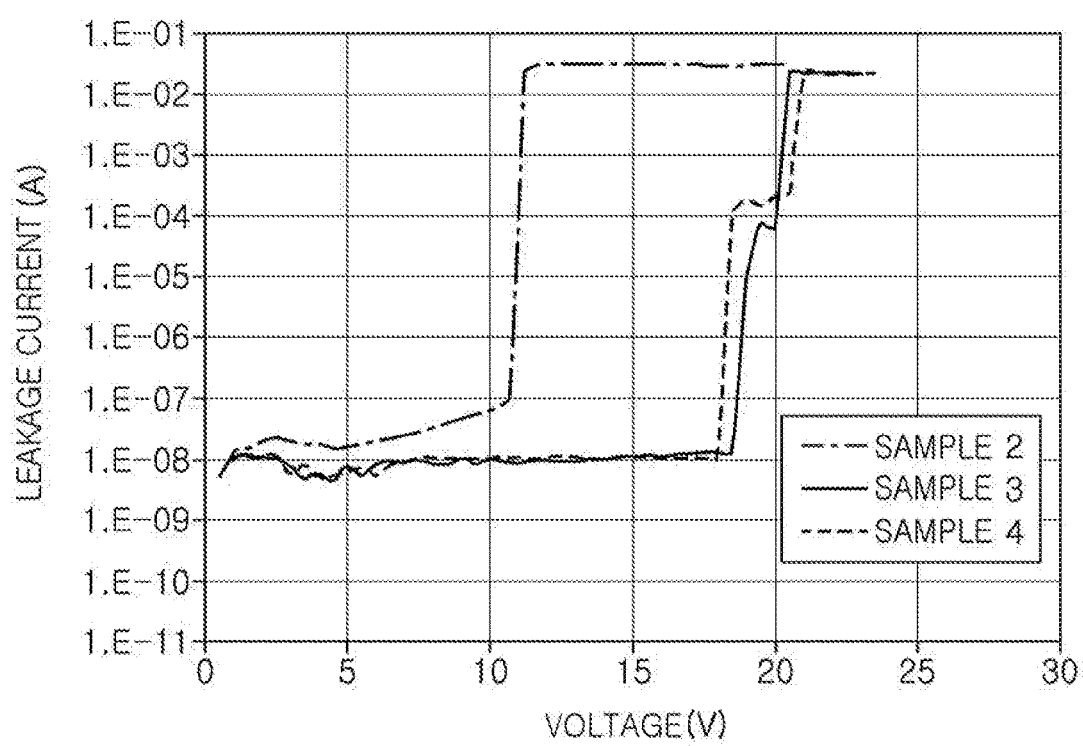
FIG. 6 is a graph illustrating leakage current characteristics of a thin film capacitor according to the related art and a thin film capacitor according to exemplary embodiments of the present disclosure.

FIG. 6 is a graph illustrating leakage current characteristics of a thin film capacitor according to the related art and a thin film capacitor according to exemplary embodiments of the present disclosure.

Referring to Table 1 and FIG. 6, in a case in which the second electrode layer have a double layer structure (sample 3) and a case in which the first and second electrode layers have the double layer structure (sample 4), capacitance was secured, and at the same time, the leakage current characteristics were improved such that a capacitor capable of enduring a high voltage may be implemented.

first and second electrode layers, respectively, may be increased, such that equivalent series resistance (ESR) of the capacitor may be decreased.

First and second external electrodes (not illustrated) may be formed to connect the first and second vias and the first and second electrode pads to each other, respectively.

The first and second external electrodes may be formed of a conductive material, and be formed by a plating method.

The conductive material may be copper (Cu), aluminum (Al), gold (Au), silver (Ag), platinum (Pt), or the like but is not limited thereto.

First and second electrode pads 151 and 152 may be formed on the first and second external electrodes, respectively, and contain a conductive material such as copper (Cu), aluminum (Al), gold (Au), silver (Ag), platinum (Pt) or the like.

The first and second electrode pads 51, 52, 151 and 152 may contain a conductive material.

The conductive material may be copper (Cu), aluminum (Al), gold (Au), silver (Ag), platinum (Pt) or the like, but is not limited thereto.

The first and second electrode pads 51, 52, 151 and 152 may include seed layers 51a, 52a, 151a and 152a, and electrode layers 51b, 52b, 151b and 152b formed from the seed layers, respectively.

The first and second electrode pads 51, 52, 151 and 152 may be disposed not to overlap the first and second vias, respectively, in the stacking direction of the dielectric layers and the electrode layers.

The first and second electrode pads 51, 52, 151 and 152 may be integrated with the first and second connection electrodes, respectively. Alternatively, the first and second electrode pads 51, 52, 151 and 152 may be disposed on the first and second connection electrodes, respectively.

The first and second electrode pads may be integrated with the first and second external electrodes, but are not limited thereto.

An insulating layer 27 may be formed in order to allow the first and second vias 31 and 32 to be electrically connected to the first and second electrode layers 21 and 22, respectively, and an insulating layer 127 may be formed in order to allow first and second vias 131 and 132 to be electrically connected to the first and second electrode layers 121 and 122, respectively.

The insulating layer 27 may be formed between the first via 31 and the dielectric layer 23, between the first via 31 and the second electrode layer 22, between the second via 32 and the dielectric layer 23, and/or between the second via 32 and the first electrode layer 21. The insulating layer 127 may also be formed between the first via 131 and the dielectric layer 123, between the first via 131 and the second electrode layer 122, between the second via 132 and the dielectric layer 123, and/or between the second via 132 and the first electrode layer 121.

The insulating layer may secure insulation between the first via and the second electrode layer and insulation between the second via and the first electrode layer, and be formed on a surface of the dielectric layer, thereby decreasing parasitic capacitance formed therein.

The insulating layers 27 and 127 may use an organic material such as benzocyclobutene (BCB), a polyimide, or the like, or an inorganic material such as $SiO_2$, $Si_3N_4$, or the like, and the insulating layer may be formed of a material having lower permittivity than that of the material of the dielectric layer in order to increase an insulation property and decrease parasitic capacitance.

The insulating layer may be formed by a chemical vapor deposition (CVD) method capable of forming a uniform film thickness on a stereoscopically complicated shape.

A protection layer 40 may be formed in order to prevent a capacitor body and the first and second external electrodes from degradation or contamination of materials caused by humidity from the outside and a chemical reaction with oxygen, and damage at the time of mounting.

The protection layer 40 may be formed of a material having high thermal resistance. For example, the protection layer 40 may be formed of an organic thermosetting material or photocurable material such as polyimide.

The protection layer may be formed by an exposure and development method of a photoresist, a spray application method, or a dipping method using a low-viscosity polymer coating solution, but the disclosure is not limited thereto.

As set forth above, according to exemplary embodiments of the present disclosure, the leakage current characteristics of the dielectric layer may be improved, and at the same time, capacitance of the capacitor may be secured.

While exemplary embodiments have been shown and described above, it will be apparent to those skilled in the art that modifications and variations could be made without departing from the scope of the present disclosure as defined by the appended claims.

What is claimed is:

1. A thin film capacitor, comprising:
a body including a plurality of first electrode layers, a plurality of second electrode layers, and dielectric layers alternately stacked therebetween on a substrate,
wherein the plurality of second electrode layers comprise at least one second electrode layer including a second lower electrode layer and a second upper electrode layer disposed on the second lower electrode layer,
wherein the second lower electrode layer includes a material having a higher band gap energy than the plurality of first electrode layers and the second upper electrode layer,
wherein the second upper electrode layer is in contact with a lower surface of one dielectric layer disposed on the at least one second electrode layer, and the second lower electrode layer is in contact with an upper surface of another dielectric layer disposed below the at least one second electrode layer, and
wherein a single via contacts an upper surface of each of the plurality of first electrode layers or an upper surface of each of the plurality of second electrode layers.

2. The thin film capacitor of claim 1, wherein the second lower electrode layer includes Pt.

3. The thin film capacitor of claim 1, wherein the second upper electrode layer includes one or more of Ir and Ru.

4. The thin film capacitor of claim 1, wherein the plurality of first electrode layers include one or more of Ir and Ru.

5. The thin film capacitor of claim 1, wherein the plurality of first electrode layers comprise at least one first electrode layer including a first lower electrode layer and a first upper electrode layer disposed on the first lower electrode layer.

6. The thin film capacitor of claim 5, wherein the first lower electrode layer includes Pt, and the first upper electrode layer includes one or more of Ir and Ru.

7. The thin film capacitor of claim 1, wherein the dielectric layers include a $PbZrTiO_3$ (PZT)-based material doped with one or more of La, Mn and Nb.

8. The thin film capacitor of claim 1, wherein among the plurality of first electrode layers, a lowermost first electrode layer includes one or more of Ir and Ru, and among the plurality of second electrode layers, an uppermost second electrode layer includes Pt.

9. A thin film capacitor, comprising:
a body including a plurality of first electrode layers, a plurality of second electrode layers, and dielectric layers alternately stacked therebetween on a substrate,
wherein the plurality of second electrode layers comprise at least one second electrode layer having a double electrode layer structure including a second lower electrode layer and a second upper electrode layer disposed on the second lower electrode layer, wherein the second lower electrode layer includes a material having a higher band gap energy than the plurality of first electrode layers and the second upper electrode layer, wherein the second upper electrode layer is in contact with a lower surface of one dielectric layer disposed on the at least one second electrode layer, and the second lower electrode layer is in contact with an upper surface of another dielectric layer disposed below the at least one second electrode layer, and wherein a single via contacts an upper surface of each of the plurality of first electrode layers or an upper surface of each of the plurality of second electrode layers.

10. The thin film capacitor of claim 9, wherein the second lower electrode layer includes Pt.

11. The thin film capacitor of claim 9, wherein the second upper electrode layer includes one or more of Ir and Ru.

12. The thin film capacitor of claim 9, wherein the plurality of first electrode layers include one or more of Ir and Ru.

13. The thin film capacitor of claim 9, wherein the plurality of first electrode layers have a same double electrode layer structure as the plurality of second electrode layers.

14. The thin film capacitor of claim 9, wherein the dielectric layers include a $PbZrTiO_3$ (PZT)-based material doped with one or more of La, Mn and Nb.

15. The thin film capacitor of claim 9, wherein among the plurality of first electrode layers, a lowermost first electrode layer includes at least one of Ir and Ru, and among the plurality of second electrode layers, an uppermost second electrode layer includes Pt.

* * * * *